US012226700B2

(12) United States Patent
Kraly et al.

(10) Patent No.: US 12,226,700 B2
(45) Date of Patent: Feb. 18, 2025

(54) VIDEO GAME FOR ENABLING REVERSAL OF POTENTIALLY-REVERSIBLE REAL-WORLD HEALTH CONDITIONS OF PLAYERS

(71) Applicant: Jennifer H. Kraly, Cleveland, OH (US)

(72) Inventors: Jennifer H. Kraly, Cleveland, OH (US); Jayce Renner, Cleveland, OH (US)

(73) Assignee: Jennifer Kraly, Cleveland, OH (US)

( * ) Notice: Subject to any disclaimer, the term of this patent is extended or adjusted under 35 U.S.C. 154(b) by 1009 days.

(21) Appl. No.: 16/206,508

(22) Filed: Nov. 30, 2018

(65) Prior Publication Data

US 2019/0091578 A1 Mar. 28, 2019

Related U.S. Application Data

(62) Division of application No. 15/237,544, filed on Aug. 15, 2016, now Pat. No. 10,150,040.

(60) Provisional application No. 62/205,551, filed on Aug. 14, 2015.

(51) Int. Cl.
| | |
|---|---|
| A63F 13/67 | (2014.01) |
| A63F 13/335 | (2014.01) |
| A63F 13/45 | (2014.01) |
| A63F 13/79 | (2014.01) |
| A63F 13/80 | (2014.01) |
| A63F 13/95 | (2014.01) |

(52) U.S. Cl.
CPC ............ *A63F 13/67* (2014.09); *A63F 13/335* (2014.09); *A63F 13/45* (2014.09); *A63F 13/79* (2014.09); *A63F 13/80* (2014.09); *A63F 13/95* (2014.09)

(58) Field of Classification Search
CPC .......... A63F 13/45; A63F 13/67; A63F 13/79; A63F 13/80; A63F 13/95; A63F 13/335
See application file for complete search history.

(56) References Cited

U.S. PATENT DOCUMENTS

| | | |
|---|---|---|
| 4,630,817 A | 12/1986 | Buckley |
| 5,678,571 A | 10/1997 | Brown |
| 5,913,310 A * | 6/1999 | Brown ................... A61B 90/00 600/300 |
| 8,332,544 B1 | 12/2012 | Ralls et al. |

(Continued)

*Primary Examiner* — Jay Trent Liddle
*Assistant Examiner* — Alyssa N Brandley
(74) *Attorney, Agent, or Firm* — Foley & Lardner LLP

(57) ABSTRACT

A system and method may include generating, by a computing system, a list of selectable challenge factors for a player to select one or more challenge factors when playing a video game. The player may be provided with the ability to set a plan for each of the challenge factors. A protocol inclusive of the planned challenge factors may be established to be achieved over a time period. A player interface may be displayed for the player of the video game, where the player interface may show the protocol inclusive of at least a portion of the planned challenge factor(s) along with corresponding input elements associated with each planned challenge factor for the player to account for the planned challenge factors by submitting whether or not the player achieved each of the respective planned challenge factors. Achieving the planned challenge factor(s) causes a health condition to be reversed.

17 Claims, 10 Drawing Sheets

(56) References Cited

U.S. PATENT DOCUMENTS

| | | | |
|---|---|---|---|
| 2007/0173325 A1* | 7/2007 | Shaw | A63F 13/86 |
| | | | 463/42 |
| 2007/0197274 A1* | 8/2007 | Dugan | A63F 13/24 |
| | | | 463/7 |
| 2007/0265092 A1* | 11/2007 | Betteridge | G07F 17/32 |
| | | | 463/42 |
| 2008/0146334 A1* | 6/2008 | Kil | G06Q 40/08 |
| | | | 463/36 |
| 2009/0048044 A1 | 2/2009 | Oleson et al. | |
| 2009/0270743 A1 | 10/2009 | Dugan et al. | |
| 2009/0325701 A1 | 12/2009 | Andres Del Valle | |
| 2010/0105525 A1 | 4/2010 | Thukral et al. | |
| 2011/0086712 A1* | 4/2011 | Cargill | A63B 71/0622 |
| | | | 463/42 |
| 2012/0171649 A1* | 7/2012 | Wander | G16H 40/63 |
| | | | 434/247 |
| 2012/0253487 A1 | 10/2012 | Dugan | |
| 2014/0147821 A1 | 5/2014 | Bernard-Paroly | |
| 2014/0287384 A1* | 9/2014 | Boyes | G09B 5/02 |
| | | | 434/127 |
| 2015/0050972 A1 | 2/2015 | Sarrafzadeh et al. | |
| 2015/0165312 A1 | 6/2015 | Kiani | |
| 2015/0364057 A1* | 12/2015 | Catani | G16H 10/60 |
| | | | 434/262 |
| 2016/0027327 A1 | 1/2016 | Jacobson et al. | |
| 2016/0055760 A1* | 2/2016 | Mirabile | G09B 5/06 |
| | | | 434/236 |
| 2016/0086500 A1* | 3/2016 | Kaleal, III | A61B 5/45 |
| | | | 434/257 |
| 2016/0129308 A1* | 5/2016 | Weast | A61B 5/6824 |
| | | | 434/247 |

* cited by examiner

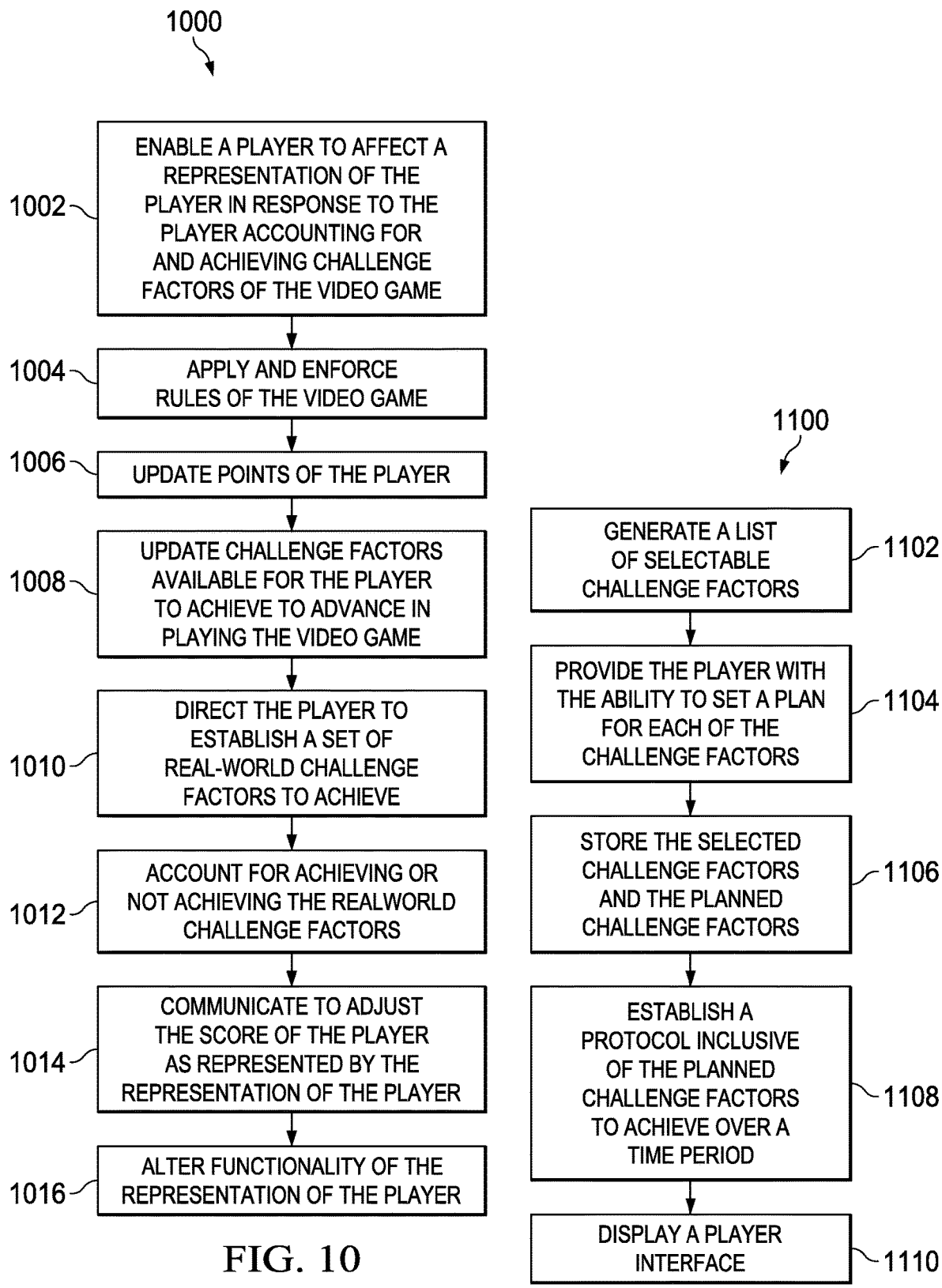

VIDEO GAME FOR ENABLING REVERSAL OF POTENTIALLY-REVERSIBLE REAL-WORLD HEALTH CONDITIONS OF PLAYERS

RELATED APPLICATIONS

This application is a divisional of U.S. patent application Ser. No. 15/237,544, filed Aug. 15, 2016 which claims benefit of U.S. Provisional Patent Application Ser. No. 62/205,551 filed on Aug. 14, 2015, the contents of which are hereby incorporated by reference in their entirety.

BACKGROUND

Many if not most people diagnosed with one or more chronic diseases do not know that many chronic diseases, including type 2 diabetes, are potentially reversible. Such chronic diseases are referred to as potentially-reversible non-communicable health conditions (PRHCs). To reverse one or multiple PRHCs, a reversal platform that may include organized expert knowledge and a delivery system for such knowledge, special services delivered electronically and/or face-to-face, various reversal-related products, and electronic and/or real-world meeting places may be used by those with PRHCs. Note, within this application, the terms "reversal", "reverse", and "reversible" should be construed as implying the terms "prevention", "prevent", and "preventable", respectively.

PRHC reversal also requires motivation. To motivate a person to begin and stay with the reversal process through completion may include the use of a system that includes elements of a gratifying game: goal(s), rules, a feedback system, and voluntary participation. To provide a person with PRHCs with tools for PRHC reversal, via a system that includes the game-related elements, the system may take the form of a video game that involves reversal-related, game-driven player experiences performed in the real world as a part of the game—combined with a supporting reversal platform.

What is needed is a new category of health games, referred to as "reversal of chronic diseases," and a video game and corresponding platform that is entertaining and produces important, "serious" outcomes—i.e., chronic disease reversal—in real life.

SUMMARY

To overcome the lack of health-related video games focused on the reversal of chronic conditions in real life, a new category of health games referred to as "reversal of chronic diseases" emerges as a result of the video game and corresponding platform provided herein. The purpose of the video game is to reverse one or more potentially-reversible health conditions (PRHC) such as type 2 diabetes, in real life. Essentially, the game makes reversing PRHCs easy and fun.

In real life, to reverse one or more PRHCs is to carry out effective reversal protocols—e.g., one protocol for each day of the week—for a limited period of time. Such protocols, combined to form what is referred to conceptually as a person's standard reversal protocol, are nothing more than sets of health-related habits and routines. For reversal protocols to be effective, two criteria may be satisfied: (1) the reversal protocols may contain health habits and routines known to reverse the targeted PRHC(s), and, of equal importance, and (2) the reversal protocols may be perfectly suited to the person, meaning, the reversal protocols may contain health habits and routines that the person wants to do, is able to do, and is allowed to do. Reversal happens as a person develops his or her reversal protocols to the point where the reversal protocols become effective. An object of the game is for the player to develop and carry out effective reversal protocols and reverse their PRHC(s) in the process.

In one embodiment, the video game starts the player off with a set of very simple reversal protocols to carry out in real life—e.g., one for each day of the week. The initial set of protocols may set up the player to go to bed at a pre-planned bedtime every day, to eat a pre-planned breakfast every day, to stop eating each day at least three hours before bedtime, and to take a pre-planned break Monday through Friday, for example.

Gameplay may begin when the player decides that he or she wants to make one or more of his or her reversal protocols more challenging and, hence, more effective. To earn periodic opportunities to make the reversal protocols more effective, the player is to successfully carry out his or her protocols (e.g., a week's worth at a time), to a certain minimum extent, as defined by the game. For example, the player may be commissioned to successfully carry out seven consecutive, day-specific reversal protocols at an average adherence rate of 70% each week; each such challenge is what the game refers to as a "mission." To help the player succeed, the game may provide various in-game tools and motivational elements, including a supportive computer-controlled player character, helpful non-player characters, and a wide variety of rewards and other forms of feedback. If the player fails at a given mission (e.g., fails to carry out the week's reversal protocols to the minimum extent required), the game may set the player up to try the mission again the following week. However, if the player succeeds at a given mission, he or she earns the opportunity to develop any one or more of his or her day-specific reversal protocols to an extent allowed by the rules of the game. And, the more missions the player wins, the more opportunities he or she has to develop the protocols. And, the more developed the protocols become, the more effective the protocols become, and the faster reversal occurs.

Beyond the goals of reversal and prevention, the game provides the player with other reasons to continue to play including special privileges for "veteran players" (e.g., those who graduate to advanced phases of the game, those who achieve and maintain reversal, etc.); such privileges include tournament eligibility, access to an exclusive dating site for those who pursue PRHC reversal and/or prevention, and structured opportunities to mentor new players.

The game shows that reversal is possible, that reversal can be fun, and that it can be forever—or, for at least as long as a player continues to play the game.

Games present players with challenges. The innovation challenges the player to accomplish consecutive missions and sub-missions (subsumed under each mission), all in accordance with the rules of the game. As stated earlier, each mission challenges the player to successfully carry out sets of day-specific reversal protocols (e.g., a week's worth at a time), to a certain minimum extent, as defined by the game. And, along the same line but on a smaller scale, each sub-mission challenges the player to successfully carry out a single protocol (e.g., a single, day-specific protocol), to a certain minimum extent, as defined by the game.

Generally speaking, for players pursuing reversal of a PRHC, the game ends when the player reverses his or her PRHC(s), and for players pursuing prevention, the game need never end. More specifically, for players pursuing reversal, the game ends upon achieving PRHC reversal unless one or both of the following actions occur: 1) the player declares one or more new PRHC reversal-related goals, and/or 2) the player declares one or more prevention-related goals which may include the prevention of the recurrence of one or more PRHCs. For players pursuing prevention, the game may be played indefinitely, as long as its utility and/or its motivational elements continue to gratify the player.

One embodiment of a video game system to provide a video game may include a storage unit configured to store data associated with the video game, and a game engine, executed by a processing unit. The game engine may include a player representation profile engine configured to enable a player to affect a representation of the player in response to the player achieving challenge factors of the video game. A rules engine may be configured to apply and enforce rules of the video game. One or more update components may be configured to be executed by the processing unit during the video game, where the update component(s) may be configured (i) to update points of the player and (ii) to update challenge factors available for the player to achieve to advance in playing the video game. A player interface engine may be configured to affect functionality of a representation of the player in response to the player accounting for and achieving or failing to account for or to achieve the real-world challenge factors. The player interface engine may be configured to direct the player to establish a set of real-world challenge factors to achieve, and be responsive to the player (i) accounting for achieving or not achieving the real-world challenge factors and (ii) achieving the real-world challenge factors. The player interface engine may be configured to communicate with the update component(s) to adjust the score of the player as represented by the representation of the player. In response to the score of the representation of the player being adjusted, the player representation profile engine may alter functionality of the representation of the player to represent that the player's achieving at least a portion of the planned challenge factors causes the health condition to be reversed.

One embodiment of a method may include generating by a computing system, a list of selectable challenge factors for a player to select one or more challenge factors when playing a video game. The player may be provided with the ability to set a plan for each of the challenge factors. The selected challenge factors and the planned challenge factors may be stored in a data repository. A protocol inclusive of the planned challenge factors may be established to be achieved over a time period. A player interface may be displayed for the player of the video game, where the player interface may show the protocol inclusive of at least a portion of the one or more planned challenge factors along with corresponding input elements associated with each planned challenge factor for the player to account for the planned challenge factors by submitting whether or not the player achieved each of the respective planned challenge factors, such that achieving at least a portion of the planned challenge factors causes the health condition to be reversed.

BRIEF DESCRIPTION

A more complete understanding of the method and apparatus of the present invention may be obtained by reference to the following Detailed Description when taken in conjunction with the accompanying Drawings wherein:

FIG. 10 is a flow diagram of an illustrative process for performing a video game; and FIG. 11 is a flow diagram of an illustrative process for performing a video game.

DETAILED DESCRIPTION OF THE DRAWINGS

Overview of Video Game System

Definition of a Video Game

Figure 1:
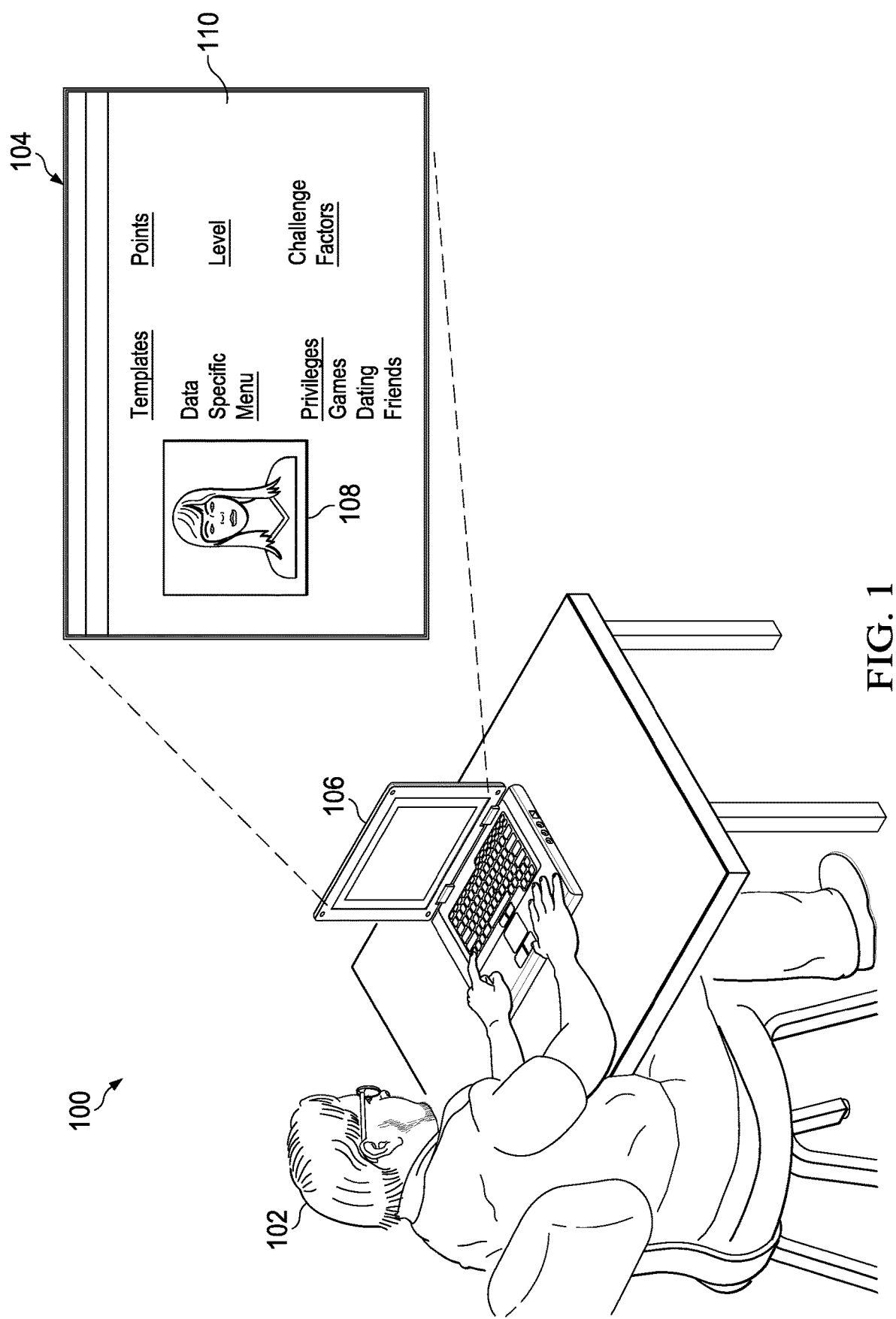
FIG. 1 is a diagram illustrating a player playing an illustrative video game and, in response to the player performing physical actions, affecting outcome, such as points, health outcomes, or otherwise, of representations of the player, such as the player's character.

According to the Wikipedia page titled, "Video Game," "[a] video game is an electronic game that involves human interaction with a user interface to generate visual feedback on a video device. The word 'video' in 'video game' traditionally referred to a raster display device, but it now implies any type of display device that can produce two- or three-dimensional images. The electronic systems used to play video games are known as platforms; an example of a platform is a personal computer." Definitions of "video game" in other treatises are similar in scope.

The PRHC Video Game within the Universal Set of Video Games

In short, the PRHC reversal system enables people with PRHCs to not only reverse and/or prevent their targeted PRHCs, but also have fun in the process. As understood, people in general enjoy playing video games.

As a video game, the innovation fits within the definition of a video game and falls within multiple video game categories.

Video games appeal to a wide range of individuals, and, therefore, serve as a potentially powerful medium by which to capture the interest of large numbers of people. In addition to serving as a source of entertainment, video games provide an extensive range of player experiences delivered and/or supported by digital technology. Player experiences supported by digital technology may include player experiences performed in the real world as a part of the game. By contrast, player experiences delivered by digital technology typically refer to player experiences performed in a fictional world. Regarding the subject PRHC reversal platform, digital technology to both support and deliver player experiences for the purpose of enabling the player to achieve and maintain good health is used. That is, the PRHC reversal platform uses digital technology to support player experiences by, for example, helping the player organize, commit to, and manage various player experiences performed in the real world as a part of a video game; such experiences include creating, developing, and adhering to a reversal protocol—i.e., a protocol designed to enable the player to reverse one or more of his or her potentially-reversible health conditions. The platform uses of digital technology to deliver player experiences by, for example, applying algorithms and presenting high-quality graphics to help the player suspend disbelief and, in essence, "pretend" that various game-specific concepts (e.g., "challenge factors," "missions," "sub-missions"), elements (e.g., points, praise), and characters (e.g., player and non-player characters), are real.

In terms of its placement within the universal set of video games, the PRHC reversal platform falls into the video game subcategory of "serious video games," and, within the serious video games category, it falls into the category of "healthcare" and the subcategory of serious video games for health, otherwise referred to as "health games." As understood in the art, a serious video game is a type of video game that attempts to entertain and change the player; such changes may include changes in the player's attitudes, beliefs, perception of risk, knowledge, skills, and/or behavior. Thus, serious video games have dual and seemingly disparate goals: 1) to be fun, and 2) to produce important or "serious" outcomes. The serious video games described as health games are those designed to entertain the player and, at the same time, change his or her health behavior(s). Changing health behaviors typically refers to changing behaviors associated with eating, lifestyle, and/or stress-related activities; such changes often boil down to breaking sets of bad habits and developing sets of good ones. The innovation focuses not only on entertaining the player and changing his or her health behaviors, but also on motivating and training the player to want to engage in various health behaviors, including, for example, systematic health behavior-related planning, and the systematic reporting of the extent to which behavior-related plans were carried out or "matched."

A subset of games within the health games category focuses on the management of chronic diseases such as type 2 diabetes. That said, no subset of games within the health games category focuses on the reversal of chronic diseases, despite the fact that many such conditions, including type 2 diabetes, are potentially reversible. Furthermore, the existing chronic disease-related health games that include player experiences performed in the real world as a part of the game do not incorporate the expert knowledge, player autonomy, motivational elements, and organization used to make reversal and/or prevention of the (re)occurrence of one or more PRHCs the goal of a game.

As depicted in FIG. 1, an illustration of a video game environment 100 includes a user 102 playing a video game 104 on an electronic device, in this case a computer 106. The video game 104 may be designed to enable a player to reverse or prevent one or more potentially-reversible, non-communicable, lifestyle-related health conditions (PRHCs), such as type 2 diabetes, is shown.

Plan Builder

Figure 2:
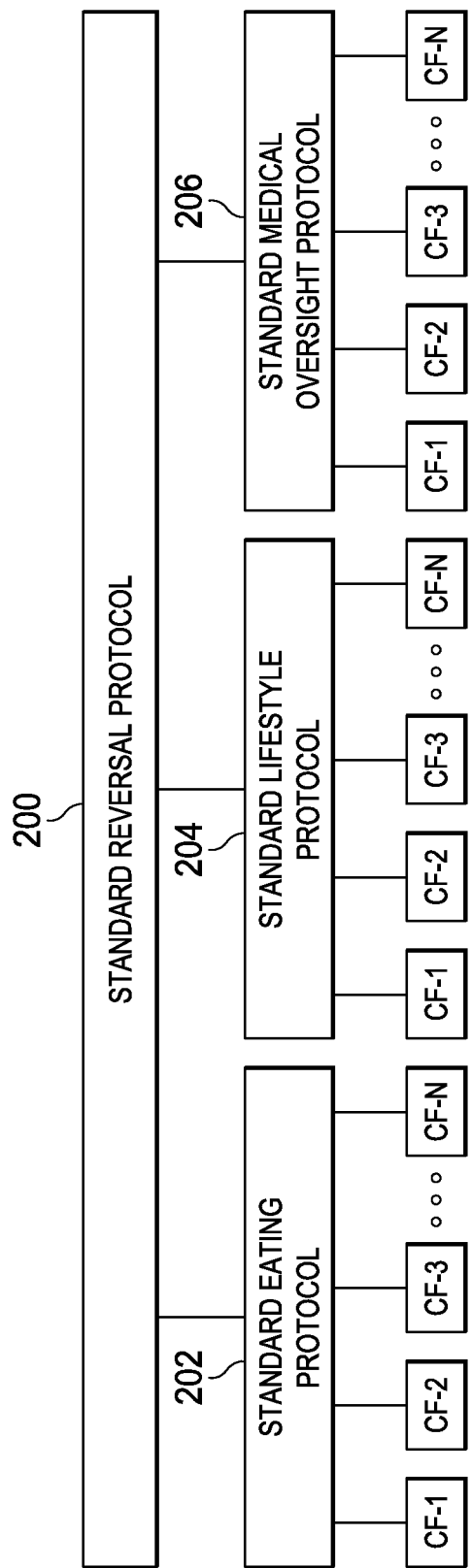
FIG. 2 is a diagram illustrating contents of an illustrative reversal protocol comprised of three distinct sub-protocols—an eating protocol, a lifestyle protocol, and a medical oversight protocol—each of which contain a set of protocol-specific challenge factors that are utilized in the video game provided herein.

As shown on FIG. 2, a standard reversal protocol 200 may be comprised of various standard protocols that define rules or processes by which the player is to adhere when playing the video game. The standard reversal protocol 200 may include a standard eating protocol 202, a standard lifestyle protocol 204, and a standard medical oversight protocol 206. One or more respective sets of challenge factors $CF_1$-$CF_N$ may be associated with each of the protocols 202, 204, and 206 and used by the video game 104 of FIG. 1 for gaming purposes.

In operation, the player creates each protocol by interacting with the video game 104 and entering plan information. In the video game 104, the player may engage in missions that include planning and enacting various reversal-related behaviors in real life. More specifically, the player may (1) choose individual system-provided, selectable behavior-related challenges or "challenge factors" on which to focus (e.g., adhering to a bedtime and rise time schedule), (2) personalize each challenge factor with a specific plan (e.g., going to bed every day by 10:00 pm, and getting up every day at 6:00 am) using a system provided plan builder, and (3) enact those challenge factor plans in real life (i.e., the player is to perform the challenge factors). Such plans combine to form what is referred to herein as the player's standard reversal protocol 200 and may be identified by the system. Each protocol may be defined by a period of time, such as days and/or dates specified. It should be understood that the challenge factors described above for each of the protocols are illustrative, and that other challenge factors may be utilized.

To reverse a player's PRHC, the player develops and follows his or her standard reversal protocol 200 over time. To develop the standard reversal protocol 200, the game provides the player with an array of challenge factors $CF_1$-$CF_N$ that the player may consider including as part of the protocol, and tools designed to help the player create, carry out, and further develop the protocol over time. More specifically and as a part of the game, the player has the power to make the protocol more or less challenging based on the speed at which s/he wants to reverse. The player also has the power to revise the protocol from time to time (e.g., weekly). In the end, success depends on the player's ability to balance his or her ambition (the speed at which he or she wants to reverse his or her PRHC) against his or her developing ability to carry out the protocol provided for in the game. The more ambitious the protocol and the closer the player follows the protocol, the more game rewards and privileges the player earns, which results in more opportunities the player has to further develop the protocol (e.g., add new challenge factors), which results in the greater the likelihood that the player will reverse his or her PRHCs sooner rather than later or at all. The video game may serve as an augmented reality for the player, thereby causing the player to reverse his or her PRHC though success in the video game, which reduces or eliminates typical mental stress that often comes with an individual trying to reverse his or her PRHC.

To motivate the player 102 to continually perform challenge factor plans in real life, the video game 104 provides the player with opportunities to earn points, receive virtual awards, and enjoy various privileges as a result of the player being successful in real life achievements. As an example, a player who follows a meal plan as set forth in the video game may cause the player to account for achieving or not achieving challenge factor plans, etc., which, in turn, may cause a representation of the player to achieve improved health or a certain performance level or skill, or to achieve rewards of its own.

As noted above, a player representation 108 (e.g., virtual character) in the video game 104 may benefit as a result of the player's successful achievement of game-related real world actions. The representation 108 may be set forth in non-graphical terms, as well. In an embodiment, functional of the representation of the player may be altered, where the functionality may include changing operation of a virtual character, altering the ability for the representation of the player to access additional challenge factors, changing player feedback data being presented to the player, providing the representation of the player the ability to access additional and/or alternative areas within the video game 104, and so forth. The video game 104 benefits to the player may include earning points 110, receiving virtual awards, achieving higher levels, and receiving privileges (e.g., access to new areas of the video game or video game affiliates). Specifically, earned points 110 provide feedback to the player, enabling him or her to determine how to proceed. Additionally and under certain conditions, earned points in the form of credits may be redeemed for actual products and services. Such credits may also be used by the player to enable friends and family to join in and play the reversal game for themselves for free or at a discounted rate. And, in addition to points, virtual awards, such as trophies and badges, may be awarded to the player; such awards may be received based upon the achievement of various behavior-related milestones.

Video Game System Architecture

Figure 3:
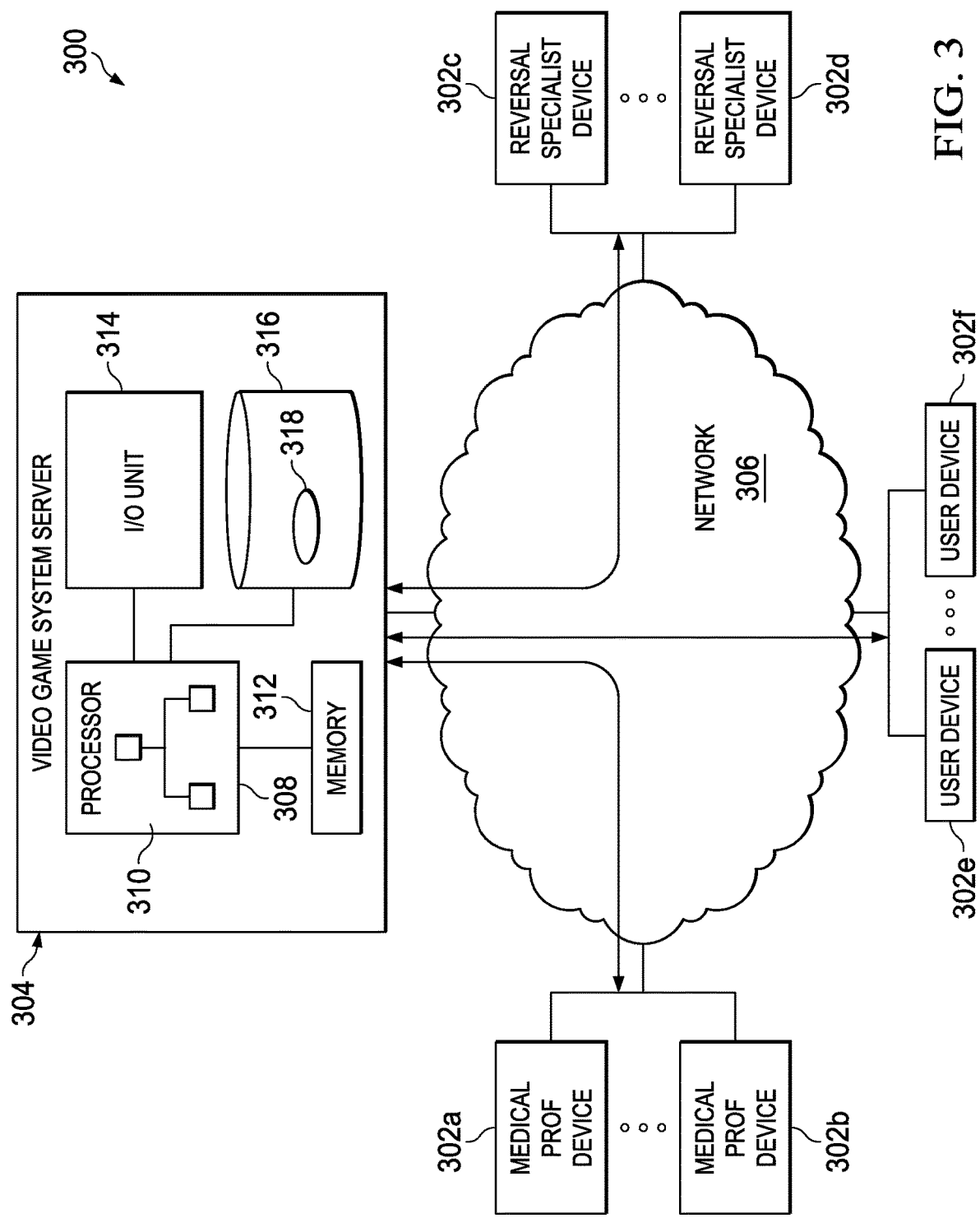
FIG. 3 is a diagram of an illustrative video game network environment inclusive of electronic devices that access a video game system server through a network.

FIG. 3 is a diagram of an illustrative video game network environment 300 inclusive of medical professional devices 302a-302b, reversal specialist devices 302c-302d, and user or player devices 302e-302f (collectively 302) that may access a video game system server 304 via a communications network 306. The video game system server has a processing unit 308 that executes software 310 to provide for the features and functions (e.g., modules) described herein. The processing unit 308 may be in communication with a memory 312, input/output unit 314, and a storage unit 316 that store one or more data repositories 318. It should be understood that the processing unit 308, memory 312, 110 unit 314, and storage unit 316 may be particularly configured when executing software to perform the video game and other functionality, as described herein. The devices in communication with the video game system server may be desktop computers, laptop computers, mobile devices, such as tablets and smart phones, or any other networked electronic device. The server 304 may host a website, gaming interface or otherwise for users of the devices to access via the network.

Figure 4:
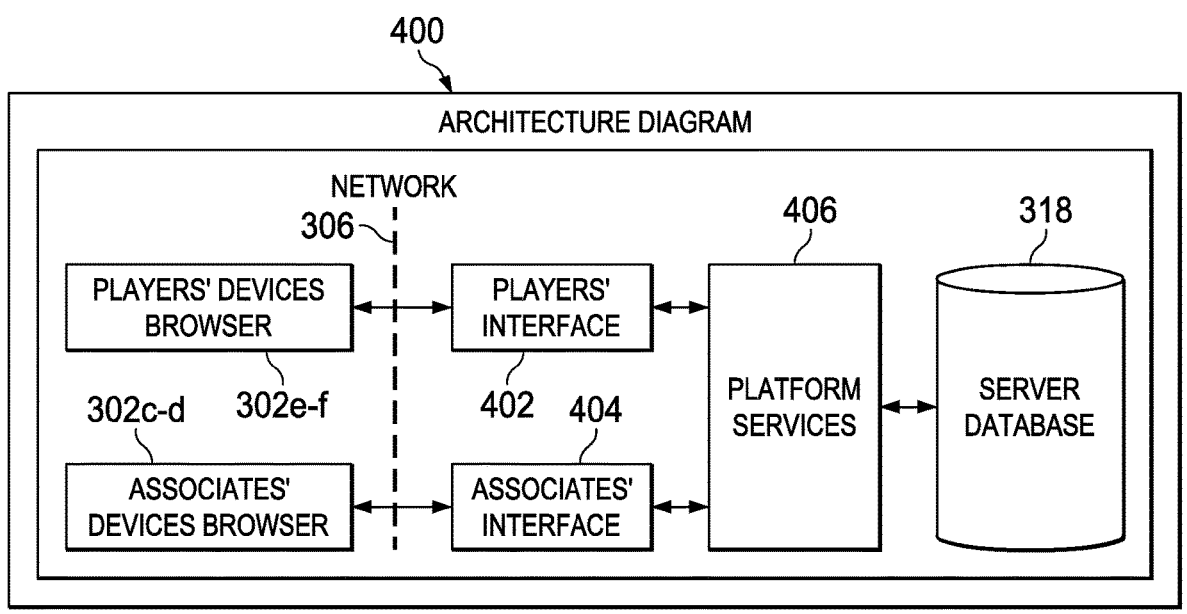
FIG. 4 is an architecture diagram depicting various illustrative devices and browsers that access system services and interfaces over a communications network.

FIG. 4 is a diagram illustrative of an illustrative video game architecture 400 depicting user or player devices 302e-302f accessing player interface or player interface engine 402 and associates (e.g., reversal specialists) devices 302c-302d accessing an associates interface 404 over the communications network 306. Interfaces 402 and 404 may access system services 406 to perform data transformations, provide gaming functionality, store data, and retrieve data using server data repositories 318, which may be in the form of a database, such as a relational database. This architecture 400 may support any number of interfaces with interfaces 402 and 404 being illustrative. In this way, the flexible, scalable architecture allows the system to serve the needs of a large player population.

The video game system may be set up to support up to millions of players to play simultaneously. The video game system may operate within the context of an individualistic structure, a competitive structure, and/or a cooperative structure, as further described herein.

Figure 5:
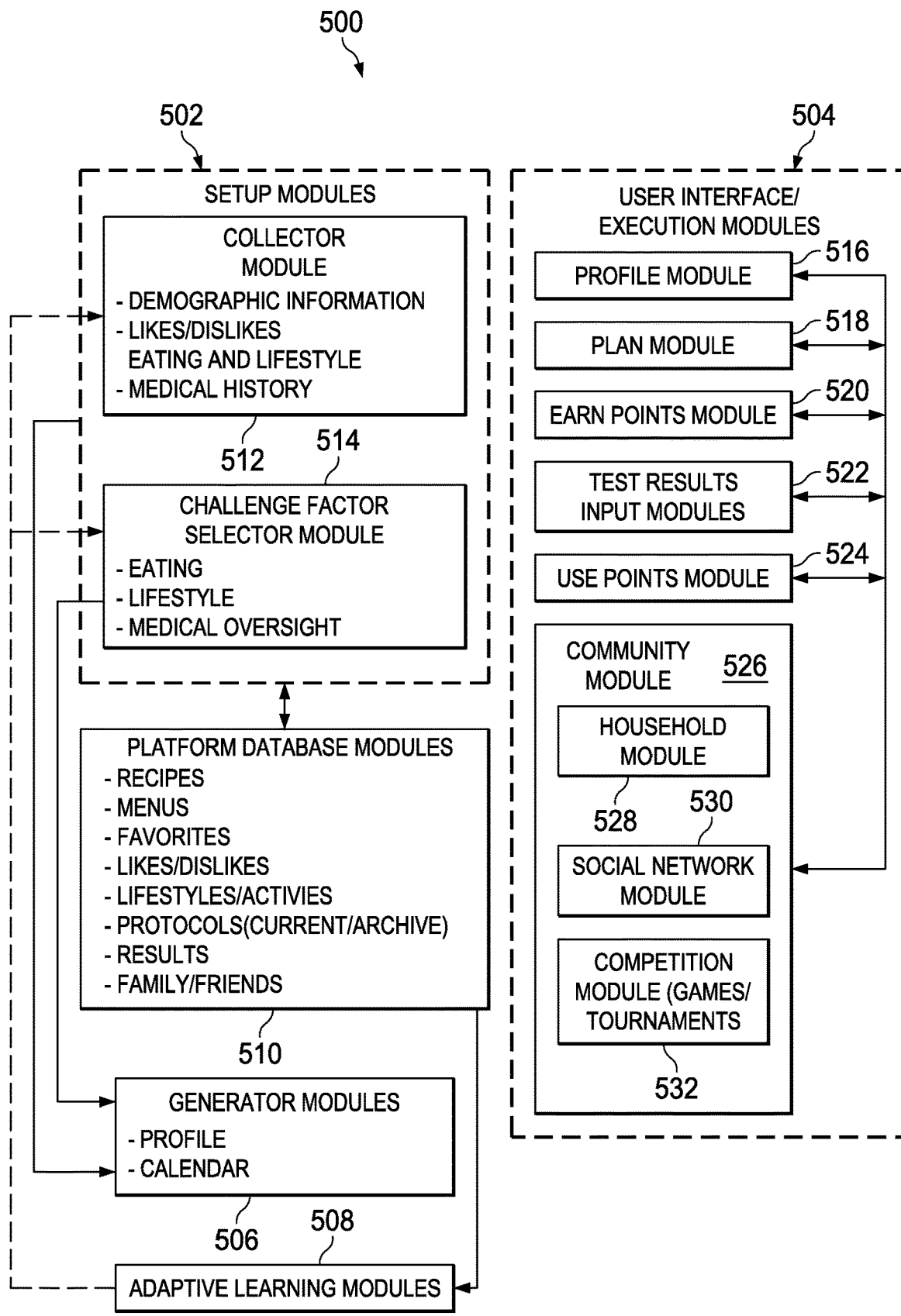
FIG. 5 is an illustration of illustrative modules, including set-up modules, user interface execution modules, generator modules, and adaptive learning modules that may all interact with the system database modules for supporting the video game.

FIG. 5 is an illustration depicting modules 500 used by the video game. The modules 500 may include video game set-up modules 502, user interface execution modules 504, generator modules 506, and adaptive learning modules 508 that may interact with the system database modules 510. The modules 500 are utilized by players and support the video game to assist the player in reversing his or her PRHC.

The setup modules 502 may include a collector module 512 configured to collect player information, including demographic information, likes/dislikes related to eating and lifestyle, and medical history information. The collector module 512 may be configured to display one or more graphical user interfaces that provide for listings of selectable information for the player to provide for his or her demographic information, likes and dislikes related to eating and lifestyle, and medical history. The information collected by the collector module 512 may be stored in a data repository in association with the player, and used during gaming operations, including establishing challenge factors.

The data collected by the setup modules 502 may be communicated to the platform database modules 510. The platform database modules 510 may be used to store recipes, menus, favorites, likes/dislikes, lifestyles/activities, protocols (current/archive), results, and family/friends. The platform database modules 510 may be configured to store and access the data stored in data repositories associated with each of the users. As an example, a recipe module may be configured to access recipes stored in the data repository. The video game may thereafter access the recipes that are consistent with or match a player's food likes to be included in a menu for a meal on a particular day. The platform database modules 510 may manage data associated with the player, and update the data while the player is playing the video game. As an example, as a result of the player's achieving certain challenge factors, the results platform database module of the platform database modules 510 may update the database with the player's achievement.

The challenge factor selector module 514 may enable the user to establish challenge factors. The challenge factors may include eating challenge factors, lifestyle challenge factors, and medical oversight challenge factors. The challenge factor selector module 514, in response to receiving the desired challenge factors for the player, may select challenge factors to be set and stored in a data repository in association with the player. In an alternative embodiment, the challenge factor selector module 514 may be configured to enable the user to allow for the video game to automatically select the challenge factors for the player. In selecting the challenge factors for the player, the challenge factor selector module may utilize the demographic information, likes/dislikes related to eating and lifestyle, and medical history in making the selections that are appropriate for the player. If the player is to select his or her challenge factors, then the video game may present available challenge factors for the player to select may be based on the player's demographic information, likes and dislikes, and medical history.

The generator modules 506 may be configured to generate a profile and calendar for the player. In generating the profile and calendar, the generator modules 506 may receive data collected by the collector module 512 and challenge factor selector module 514 so that the generator modules 506 may generate the player profile and calendar. The player profile may be inclusive of the player's demographic information, likes and dislikes related to eating and lifestyle, and medical history. The calendar may include meals, challenge factors, medical appointments, exercise, specialist visits, family member participation, and any other information related to the video game in which the player is to engage while playing the video game.

The user interface/execution module 504 may include a profile module 516 that enables the user to create and/or edit his or her profile through a user interface that the profile module 516 may be configured to create. A plan module 518 may be configured to enable the user to generate his or her plan by which the video game is to use for establishing and monitoring player standard reversal protocols 200. The plan module 518 may store the player's standard reversal protocol 200 in the server database 318. A plan module 518 may be used in establishing an eating plan, calendar, and/or other plan, for example, and be used to establish challenge factors. An earn points module 520 may be configured to enable the player to earn points while playing the video game. The earn points module 520 may receive and respond to the player when he or she submits that a challenge factor has been completed or has not been completed. In an embodiment, the player may be able to earn points as recorded by the earn points module 520 by successfully completing actions, tests (e.g., quizzes about reversal activities, ingredients, meals, exercise, blood glucose levels, etc.), virtual video game activities (e.g., preparing and cooking virtual meals), or otherwise. In an embodiment, if an electronic device, such as a wearable electronic device, measures a player's exercise, sleep patterns, or otherwise, then the earned points module 520 may use measurement data collected by the electronic device to automatically determine whether or not the player earn points in the video game (e.g., if the player took 10,000 steps, the player achieves a challenge factor; if the player went to sleep before 10 pm, the player achieves a challenge factor).

Test results input modules 522 may enable a medical professional, the player, they reversal specialists, or otherwise to submit test results. The test results may include a variety of different tests, including blood tests, fitness tests, weight tests, or any other test that is able to show improvement as a result of playing the video game and completing challenge factors.

A use points module 524 may enable the player 102 and the video game system to use points in a variety of ways. The video game system may provide for a number of different point types.

Effort points: Effort points may represent effort that the player invests in order to achieve reversal. Total effort points provide a crude measure of the players' effort over a period of time and compared to other players. Effort points may include challenge factor points.

Challenge Factor Points: Challenge factor points may represent protocol-related effort. Challenge factor points may include accounting points and achievement points. In an embodiment, the player may earn an accounting point each time he or she reports whether or not he or she successfully achieved a particular challenge factor action. The player may earn an achievement point each time he or she reports having successfully achieved a particular challenge factor action.

Achievement points: Achievement points may represent challenge factor actions the player achieved or "matched." The game may use the terms "achieve" and "match" interchangeably for the reason that to achieve a challenge factor action is to meet or "match" a challenge factor plan that defines that action. In the game, some matches may be determined by the system, and other matches may be determined by the player. For example, one challenge factor action may be for a player to enter a daily to-do list no later than 6:00 pm the night before into the video game system; in this example, the game determines if a match occurs based on whether or not a daily to-do list was entered by the deadline as defined by the rules of the game.

Automatic analyses performed by the system analyzing the player's planned or "potential" challenge factor points versus the player's achieved or "actual" challenge factor points may produce statistics describing the player's level of adherence in terms of percentages. The video game may use these statistics to enforce the rules of the game. The video game may also use the statistics of the player as feedback to enable the player to assess his or her current status as he or she works toward winning each of the game's missions. As defined by the rules of the game, adherence to a reversal protocol, or to one or more protocol elements, may involve (i) acknowledging or "accounting for" one's action and inaction via physical reporting (e.g., paper reporting) or electronic reporting (e.g., a web-based reporting system), and (ii) acting in accordance with a reversal protocol or to one or more protocol elements to a measurable extent.

The player may use total accounting points, total achievement points, and/or total effort points to compare his or her level of effort from period to period (e.g., from day to day, week to week, year to year) or to compare his or her own level of effort with the levels of effort of other players. The game may also use players' challenge factor points in order to calculate players' handicaps which, in turn, enable players of various levels of experience to compete against one another. The competition may range from a general comparison of relative achievement points (e.g., friends or social group comparing their weekly challenge factor efforts) to serious competition between players that may be used to earn additional points and/or prizes.

A community module 526 may be used to establish a player's community. The community modules 526 may include a household module 528 that may establish and maintain interaction with household members of the player, social network module 530 that may be used to maintain communication with a players social networks, and competition module 532 that may enable the player to engage in competition, including games, tournaments, or other gaming interactions via the video game. Each of these community modules 526 may be used to encourage the user to succeed in playing the video game. In one embodiment, household members that are able to interact with the video game via the household module 528 may help the player achieves challenge factors. As an example, the household members may perform an activity, such as participating in a challenge factor (e.g., walking a mile in each day of the week with the player), and that participation may be recorded as a successful challenge factor, which helps the player in the video game. Friends of the player who interact with the video game via the social network module 530 may also help the player achieves challenge factors by the friends participating in certain activities and recording those activities via the social network module 530 user interface of the video game.

Adaptive learning modules 508 may be configured to access data being generated by each of the players using the video game to determine which players are reversing their PRHC when achieving their challenge factors and which are not reversing their PRHC despite achieving their challenge factors. The adaptive learning modules 508 may, in response to learning that certain players are reversing and other are not reversing their PRHC, learn to determine how players who have similar characteristics can reverse their PRHC. As an example, the learning algorithms may identify players with similar lifestyles, physical characteristics (e.g., blood types), work lives, and so forth and establish challenge factors that have worked for other players in reversing their PRHC, thereby optimizing the ability and speed of reversal of PRHC for the players. The use of K-nearest neighbor and other learning algorithms may be used as part of the video game and adaptive learning modules 508.

Relational databases on the server database 318 may store the data used by the video game. The server database 318 may store transactional data that the system functionality uses to present information to and save information from the player. The data may include charts, reports, statistics, analyses, and machine learning. A regularly-occurring process may transform the transactional data in the server database 318 into the data formats in the data warehouse. TABLE I below describes data that may be stored in the server database 318, and be used by the video game that, in part, aids in reversal of PRHC of the players thereof.

TABLE I

Relational Databases Used by Video Game

Figure 6:
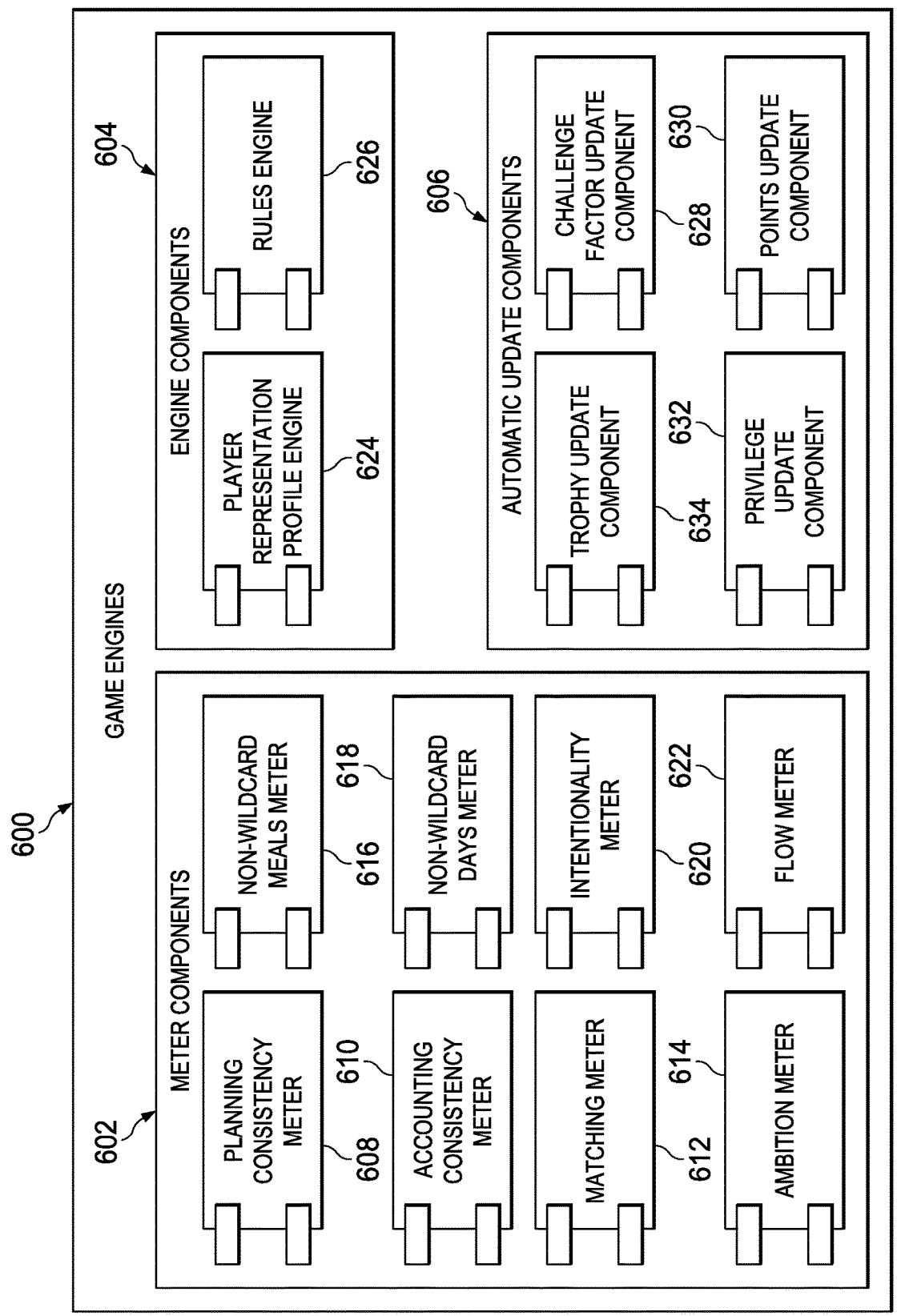
FIG. 6 is a diagram illustrating components of a game engine, where the components may include meter components, engine components, and automatic update components.

1. Data Warehouse
    a. Reversal Charts
    b. Other Results Charts
    c. KNN
    d. ERT
2. Operational Data Store Tables and Fields (all tables have a not shown ID field)
    a. Players
        i. First name
        ii. Fast name
        iii. Email address
        iv. Accounting point total
        v. Completion point total
        vi. Bonus point total
        vii. Start date
        viii. Subscription level
        ix. Last active date
    b. Players-to-players relationships (Players' community)
    c. Point Transactions
        i. Date
        ii. Time
        iii. Player ID
        iv. Point amount
        v. Point type
        vi. Before balance
        vii. After balance
        viii. Challenge factor ID
    d. Challenge Factors
        i. Name
        ii. Domain
        iii. Category
        iv. Time component type
        v. List component type
        vi. Is leveled
        vii. Is household
    e. Player Challenge Factors
        i. Player ID
        ii. Challenge factor ID
        iii. Active date TABLE I-continued Relational Databases Used by Video Game iv. Active week
        v. Ambition level
        vi. Plan
   f. Player Representation
        i. Player ID
        ii. Name
        iii. Facial expression
        iv. Health status
   g. Trophies
        i. Player ID
        ii. Type
        iii. Date
   h. Eligibilities
        i. Player ID
        ii. Active date
        iii. Eligibility type (dating site)
   i. Player Goals
        i. Player ID
        ii. Goal type (prevention, reversal)
        iii. Condition ID
        iv. Start date Detailed Descriptions of Certain Tool and Module Functionality Game Engine FIG. 6 is a diagram of an illustrative game engine 600. The game engine 600 may include a set of background processes in the system that may enforce rules of the game and make automatic updates to the game state. The following sets of components may define the game engine: meter calculation components 602, engine component 604, and automatic update components 606. Additional and/or alternative components may be utilized, as well, such as player interface engine components that enable the user to interface with the system.

Each of the meter components 602 has a different algorithm for calculating a numeric value (0 to 100, for example) for the player 102. Numeric values may be rounded to the nearest whole number before each meter's numeric value is stored in the server database 318. The meters provided by the video game system may include a planning consistency meter 608, an accounting consistency meter 610, a matching meter 612, an ambition meter 614, a non-wildcard meals meter 616, a non-wildcard days meter 618, an intentionality meter 620, and a flow meter 622.

Planning Consistency Meter

The Planning Consistency Meter component 608 may calculate the amount of planning consistency of the player 102. Consistency in planning is used by the player 102 to establish a working standard reversal protocol 200. A numeric value for the Planning Consistency Meter may be calculated by comparing the player's eating, lifestyle, and medical oversight plans for a current week against a previous week's plans. In one embodiment, plans that are totally consistent may result in a numeric value of 100. The algorithm may consider each planned item for the current week and identify the exact same planned item in the previous week's plans, disregarding the date property of the two items. To calculate the numeric value of the Planning Consistency Meter, the algorithm may count the found planned items, divide that number by either the number of the current week's total planned items or the number of the previous week's total planned items, whichever is higher, and multiply the quotient by 100. For example, if a player 102 has ten items planned the previous week, and nine of these items appeared on the current week's schedule, the numeric value stored is 90. Alternative algorithms may be utilized, as well.

Accounting Consistency Meter

The Accounting Consistency Meter component 610 may calculate the player's amount of behavioral accounting over the past seven or other number of days. Accounting for behaviors helps the player 102 make adjustments to eating and lifestyle behaviors since the player 102 is to recognize his or her behaviors in order to change those behaviors. The numeric value for the Accounting Consistency Meter 610 is calculated by comparing the player's challenge factor $CF_1$-$CF_N$ amount and the amount of accounting points earned and be averaged for the past seven days, for example. For the past seven days, the algorithm divides the number of accounting points earned for the day by the player's number of challenge factors $CF_1$-$CF_N$. To calculate the Accounting Consistency Meter numeric value, the algorithm may multiply the average of the quotients by 100. For example, if the player 102 earned these accounting points for the last seven days: 6, 16, 10, 15, 8, 20, 15; and if the player 102 had these challenge factor amounts for the last seven days: 12, 32, 10, 15, 16, 20, 15; on three days, the player 102 accounted for half of his or her challenge factors $CF_1$-$CF_N$, and accounted for all of them on the other four. Therefore, the numeric value stored would be the rounded average of 0.5, 0.5, 1, 1, 0.5, 1, and 1 times 100 for a result of 79.

Matching Meter

The Matching Meter component 612 may calculate the player's completion amount of planned behaviors. To properly reverse PRHCs, the player 102 may complete planned behaviors. The numeric value for the Matching Meter may be calculated by comparing the player's potential point amount and the amount of points earned, averaged for the past seven days. For the past seven days, the algorithm divides the amount of points earned for the day by the player's amount of potential points. To calculate the Matching Meter numeric value, the algorithm may multiply the average of the quotients by 100. For example, if the player 102 matched this many behaviors for the last seven days: 12, 24, 7, 15, 8, 20, 15; and if the player 102 had these challenge factor amounts for the last seven days: 12, 32, 10, 15, 16, 20, 15; the numeric value stored is 85 or the rounded average of 1, 0.75, 0.7, 1, 0.5, 1, and 1 times 100.

Ambition Meter

The Ambition Meter component 614 may calculate the player's self-reported level of ambition regarding his or her current set of challenge factors. The ambition meter 614 allows the player 102 to correctly interpret his or her behavioral outcomes. For example, a highly ambitious player 102 may be able to see that although they only matched 50% of their behaviors, he or she can see his or her actions in the context of being highly ambitious. The numeric value for the Ambition Meter may be calculated by comparing the player's highest possible ambition level and the player's actual ambition level. The highest possible ambition level may be three multiplied by the amount of ambition-rating responses gathered from the player 102 for challenge factors where a corresponding event is on the player's schedule for the current week. The actual ambition level may be a total of the player's scored ambition-rating responses for challenge factors where a corresponding event is on the player's schedule for the current week. Ambition-rating responses may be scored as one for low ambition, two for medium ambition, and three for high ambition. The algorithm may divide the player's actual ambition level by the player's highest possible ambition level. To calculate a numeric value of the Ambition Meter, the algorithm may multiply the quotient by 100. For example, if the player 102 had supplied these ambition-rating responses for challenge factors, where a corresponding event is on the player's schedule for the current week: low, medium, high, low, medium, high, and medium; these would be scored as 1, 2, 3, 1, 2, 3, and 2; and the stored numeric value would be 67 or 0.666 (14 divided by 21) times 100, rounded. Each month, or other time period, the system may ask the player 102 to rerate the ambition level associated with each active challenge factor.

Non-Wildcard Meals Meter

The Non-Wildcard Meals Meter component 616 calculates how many of the player's recent meals did not include wildcards. Reducing the consumption of wildcards per meal may improve reversal of PRHCs. The numeric value for the Non-Wildcard Meals Meter 616 is calculated by comparing the player's number of meals that included wildcard foods and the amount of meals that did not, and be averaged for the past seven days. For the past seven days, the algorithm may divide the number of meals that did not include wildcard foods for the day by the player's number of meals. To calculate the Non-Wildcard Meals Meter numeric value, the algorithm may multiply the average of the quotients by 100. For example, if the player 102 had 20 meals in the last seven days, and 15 of them did not include wildcard foods, the stored numeric value is 75.

Non-Wildcard Days Meter

The Non-Wildcard Days Meter component 618 calculates how many of the player's recent days did not include wildcards. Reducing the consumption of wildcards overall may improve reversal of PRHCs. A numeric value for the Non-Wildcard Days Meter may be calculated by comparing the player's number of days that included wildcard foods and the number of days that did not, and be averaged for the past seven days. For the past seven days, the algorithm may divide the amount of days that did not include wildcard foods by seven. To calculate the Non-Wildcard Days Meter numeric value, the algorithm may multiply the quotient by 100. For example, if the player 102 did not have wildcards on five of the past seven days, the stored numeric value is 71.

Intentionality Meter

The Intentionality Meter component 620 may calculate the percentage of the amount of time in a given week that the player 102 has scheduled items for (potential versus actual planning amount). For the current week, the algorithm may divide the number of minutes in all of the schedule items by 10,080. To calculate a numeric value for the Intentionality Meter, the algorithm may multiply the quotient by 100. For example, if the player's current week's schedule had schedule items totaling 5,040 minutes, the stored numeric value is 50.

Flow Meter

The Flow Meter component 622 may be used to calculate and generate a flow meter, and may calculate the player's quality of his or her current experience playing the video game. A high value of the Flow Meter may mean that the player 102 is doing the best he or she can to reverse his or her PRHCs. A low value of the Flow Meter may mean that the player 102 should make adjustments to his or her standard reversal protocol 200 or behavior to get on track towards reversal and to improve the state of the representation of the player 102 (e.g., a player's character). The numeric value for the Flow Meter may be calculated using the player's matching level and the amount of challenge factors CF1-CFN recently added, until the player 102 begins to reverse his or her PRHCs. After which, a value of the Flow Meter may be calculated by the same method as the numeric value of the Matching Meter. Before the player 102 reverses his or her PRHCs, two values may be added together to calculate the numeric value of the Flow Meter. In one embodiment, the first value is the Matching Meter numeric value divided by two. For the second value, a number of new challenge factors the player 102 added for the current week divided by the amount of new challenge factors the player 102 could have potentially added for the current week. The second value may be this quotient multiplied by 100. Adding these two values results in the Flow Meter numeric value. For example, if a player 102 had the opportunity to add four challenge factors but only added two, and the player's Matching Meter numeric value is 80, the stored Flow Meter numeric value is 65.

Character Profile Engine

Another component of the game engine 600 is a Player Representation Profile Engine 624, which are part of the engine components 604. The Player Representation Profile Engine 624 may automatically update data about the game-controlled player character, which may be displayed on the player's profile.

When the Accounting Consistency Meter numeric value is lower than a threshold level, such as 50 percent, the Player Representation Profile Engine 624 may store, in the server database 316, a frowning game-controlled player character image and a corresponding negative character message (for example, "I'm depressed. I had a lot of things to get done that I didn't get done."). When the numeric value of the Accounting Consistency Meter is at or above a threshold level, such as 50 percent or greater, the Player Representation Profile Engine 624 may store, in the server database 316, a smiling game-controlled player character image and a corresponding positive character message (for example, "I got a lot accomplished."). It should be understood that additional and/or alternative character images, static or dynamic, may be utilized.

When the Matching Meter numeric value is lower than a threshold value, such as 50 percent, the Player Representation Profile Engine 624 may store in the server database 316 the game-controlled player character health status that represents a negative outcome (for example, "I cannot feel my feet", "I cannot see", "I have chest pains when walking", and "I have to go to dialysis"). When the Matching Meter numeric value is at or greater than a threshold level, such as 50 percent), the Player Representation Profile Engine 624 stores in the server database 318 a game-controlled player character health status that represents a positive outcome (for example, "I can feel my feet", "I can see", "I have no chest pains when walking", and "I don't have to go to dialysis"). These elements of the game-controlled player character's message may serve an educational purpose for the player 102 detailing the potential health ramifications surrounding PRHC s.

When the Non-Wildcard Meals Meter numeric value is lower than a threshold level, such as 50 percent, the Player Representation Profile Engine 624 may store in the server database 318 a "sluggish" energy level in the database 318, and the platform adds text to a game-controlled player character's message (e.g., a message from the game-controlled player character) to the effect that the player 102 is to eat fewer wildcards. When the Non-Wildcard Meals Meter numeric value is at or above a threshold level, such as 50 percent or greater, the Player Representation Profile Engine 624 may store in the server database 318 an "energetic" energy level in the database 318, and the platform may remove any wildcard-related text from a game-controlled player character's message.

Rules Engine

The Rules Engine 626 may be configured to apply and enforce rules of the video game. As an example, the Rules Engine 626 may be configured to prevent the player 102 from altering the player's set of challenge factor $CF_1$-$CF_N$ plans for the current week and enforce other rules described herein.

When the player 102 does not earn accounting points within a certain timeframe or the player 102 is not matching to a certain level, the rules engine 626 may automatically create a remedial protocol that has fewer challenge factors than the player's current standard reversal protocol 200. The rules engine 626 may then send a textual message to the player 102 asking the player 102 to either 1) contact the reversal specialist to revise the player's protocol or 2) log into the video game system to adopt the automatically-generated remedial protocol. If the player 102 does not take either of these actions within a certain time period, as evidenced by the reversal specialist, for example, the rules engine 626 may send another textual message to the player 102 stating that the game is over.

Challenge Factor Update Component

If the player 102 purchases a challenge factor $CF_1$-$CF_N$ using real money, virtual money, points, and/or otherwise earns the upgrade allowing for the addition of a new challenge factor $CF_1$-$CF_N$, the challenge factor update components 628 within the Automatic Update Components 606 make the challenge factors $CF_1$-$CF_N$ available for activation by the player 102.

If the player 102 is not achieving on a given challenge factor category within a certain timeframe, the challenge factor update component 628 may send a textual message to the player 102 suggesting that he or she apply leveling to the challenge factor category. If the player 102 is not leveling up for a given challenge factor category within a certain timeframe, the challenge factor update component 628 may send a textual message to the player 102 encouraging him or her. If the player 102 is not leveling up, the challenge factor update component 628 may send a textual message asking the player 102 about the ambition level of the challenge factor plan target (e.g., 30 minutes of walking).

In one embodiment, the video game system allows the player 102 to have the video game system automatically add challenge factors $CF_1$-$CF_N$ to the standard reversal protocol

200. For example, as the player's skill level increases, the system may respond by automatically adding one or more challenge factors $CF_1$-$CF_N$ to the player's standard reversal protocol 200.

Points Update Component

As the player 102 plays the video game and performs actions that earn points, the points update component 630 records the number of points the player 102 earns in a points transaction log on the server database 316.

Privilege Update Component

Once the player 102 earns a certain number of points, which may correspond to specific privileges (for example, tournaments, dating site), the privilege update component 632 may flag these privileges on the server database 316 as being available for the player 102. Also, points may be used to add or modify inspirational content posted on the player's profile.

Trophy Update Component

When the player 102 earns points, the trophy update component 634 analyzes the achievements of the player 102 to determine if the player 102 is now eligible for any trophies. If the player 102 is eligible, the trophy update component 634 stores appropriate trophy records in the server database 316. Examples of trophy eligible achievements may include the player 102 fully maximizing the numeric value of the Non-Wildcard Days Meter as computed by the Non-Wildcard Meals Meter 616 and/or Non-Wildcard Days Meter 618 and fully maximizing the Matching Meter numeric value.

As described earlier, gameplay may begin when the player decides to make the standard reversal protocol 200 more challenging and, potentially, more effective. To earn periodic opportunities to make the reversal protocols more challenging—i.e., to earn upgrades—the player may successfully carry out the current protocol to a certain minimum extent, as defined by the game engine 600. For example, the player may be commissioned to successfully carry out seven consecutive, day-specific reversal protocols at an average adherence rate of 70% each week; each such challenge is what the game refers to as a "mission." To help the player succeed, the game may provide various in-game tools and motivational elements, including a supportive computer-controlled player character, helpful non-player characters, and a wide variety of rewards and other forms of feedback. If the player fails at a given mission (e.g., fails to carry out the week's reversal protocols to the minimum extent required), the game may set the player up to try the mission again the following week. However, if the player succeeds at a given mission, he or she earns the opportunity to develop his or her standard reversal protocol 200 to an extent allowed by the rules of the game. The more missions the player wins, the more the skill level of the player improves, which enables more opportunities for the player to develop the reversal protocol. And, the more developed the protocol becomes, the more effective it becomes, and the faster reversal occurs.

Mission rewards and reward requirements are structured by mission week. One embodiment of such rewards and requirements is presented in TABLE II. In TABLE II, the mission requirement labeled "minimum adherence level" refers to the requirement that the player adhere to a particular set of reversal protocols (e.g., a week's worth of reversal protocols, or, more specifically, a set of up to seven consecutive day-specific reversal protocols) to a certain extent. As shown in TABLE II, the minimum adherence level for mission week 3 is 70%, meaning that the player is to adhere to or "match" at least 70% of the actions presented in the protocol set contained in mission week 3. In the case of this requirement, the computer controls the player's ability to receive mission-related rewards—e.g., a predetermined number of earned upgrades—by making sure that the player's adherence level of the mission period meets a minimum adherence level, as defined by the game, prior to allowing the player to receive those rewards. In other words, the computer reconciles the player's accounting of his or her adherence against the rules of the game. The matching meter component 612 makes this calculation.

As shown in TABLE II, the reward labeled "protocol upgrades" refers to the earned opportunity to upgrade the standard reversal protocol 200 with one or more upgrades in accordance with the rules of the game. An upgrade may be defined in at least three ways. One way to upgrade may be to add to the player's standard reversal protocol 200 a new challenge factor, and a corresponding challenge factor plan. For example, one upgrade may involve adding the challenge factor, "Rise time," and then assigning three rise time actions (e.g., 7:00 am Monday, 7:00 am Wednesday, and 7:00 am Friday), for instance, to a player's protocol. A second way to upgrade may be to "level up" one existing challenge factor plan. In this game, leveling up may refer to raising the difficulty level of one or more challenge factor action(s) associated with one particular challenge factor. For example, an upgrade may involve leveling up the challenge factor plan assigned to the challenge factor labeled, "Walking." In this example, the player may elect to level up one or more challenge factor actions in that plan from 30 minutes per walk to 45 minutes per walk, for example. A third way to upgrade may be to add challenge factor actions to an existing challenge factor plan. For example, one upgrade may involve adding one or more challenge factor actions to an existing challenge factor plan. In this example, a player may elect to modify his or her current challenge factor plan associated with the challenge factor labeled, "Break time," changing the plan from having one break per weekday from 10:00 am to 11:00 am, to two breaks per weekday, one from 10:00 am to 10:30 am and another from 3:00 pm to 3:30 pm. The computer controls the player's ability to upgrade his or her reversal protocol and the number of upgrades allowed based on the rules of the game. For example, if the player satisfies the reward requirements for Week 3, the game allows the player to make one and only one protocol upgrade. In all cases, the number of upgrades allowable to the player over a given period is determined by the rules of the game and enforced by the game engine 600.

TABLE II

Mission Rewards and Reward Requirements

| Mission Week | Mission Reward Requirement: Minimum Adherence Level | Mission Reward: Maximum Number of Earned Protocol Upgrades |
|---|---|---|
| 1 | 50% | 1 |
| 2 | 60% | 1 |
| 3 | 70% | 1 |
| 4 | 80% | 1 |
| 5 | 90% | 2 |
| 6 | 90% | 2 |

TABLE II-continued

Mission Rewards and Reward Requirements

| Mission Week | Mission Reward Requirement: Minimum Adherence Level | Mission Reward: Maximum Number of Earned Protocol Upgrades |
|---|---|---|
| 7 | 90% | 2 |
| 8 | 90% | 2 |

In the embodiment, presented in TABLE II, the game limits the player to one protocol upgrade per mission win per week for the first 4 weeks, and two upgrades for each of the next four weeks. This embodiment, described TABLE II, presents an example whereby the game engine 600 determines the player's number of earned upgrades based solely on the player's Match Meter numeric value. This example is important as it reflects the possibility that a player may elect to not assign an ambition rating to each of challenge factors contained in his or her reversal protocol.

By contrast and as described in TABLE III, the game engine may determine the player's number of earned upgrades (e.g., number of challenge factors that the player is allowed to add) based on not only the player's Match Meter numeric value for that particular mission week, but also on the player's Ambition Meter numeric value for that week. In other words, TABLE III presents the maximum allowable upgrades, or as defined in this embodiment, maximum allowable challenge factor addition amount by match meter numeric value and ambition meter numeric value. For example, as illustrated in TABLE III, if the player has a match meter numeric value of 95 and an ambition meter numeric value of 50, the game engine may limit the player to adding at most 2 additional challenge factors for the upcoming week. This limits the number of challenge factors that the player may take on depending on how much the game currently challenges the player. Conversely, the game engine may determine that the player can or should increase the number of challenge factors, and notify the player to do so.

In summary, to help the player 102 maintain a state of flow and stay motivated while playing the game, the game engine 600 may limit the number of available upgrades (e.g., number of challenge factors that the player may add during a given week). The data presented in TABLE II and TABLE III illustrate two ways in which the game may calculate the number of upgrades that a player may earn based on his or her mission protocol adherence.

TABLE III

MAXIMUM ALLOWABLE CHALLENGE FACTOR ADDITION AMOUNT BY MATCH METER NUMERIC VALUE AND AMBITION METER NUMERIC VALUE

| Match Meter Numeric Value | Ambition Meter Numeric Value | | |
|---|---|---|---|
| | 0-33 | 34-66 | 67-100 |
| | Maximum Allowable Challenge Factor Addition Amount | | |
| 100 | 2 | 4 | 6 |
| 90-99 | 1 | 2 | 4 |
| 80-89 | 0 | 1 | 2 |
| 70-79 | 0 | 0 | 1 |
| <70 | 0 | 0 | 0 |

Upgrade Calculator

Figure 7:
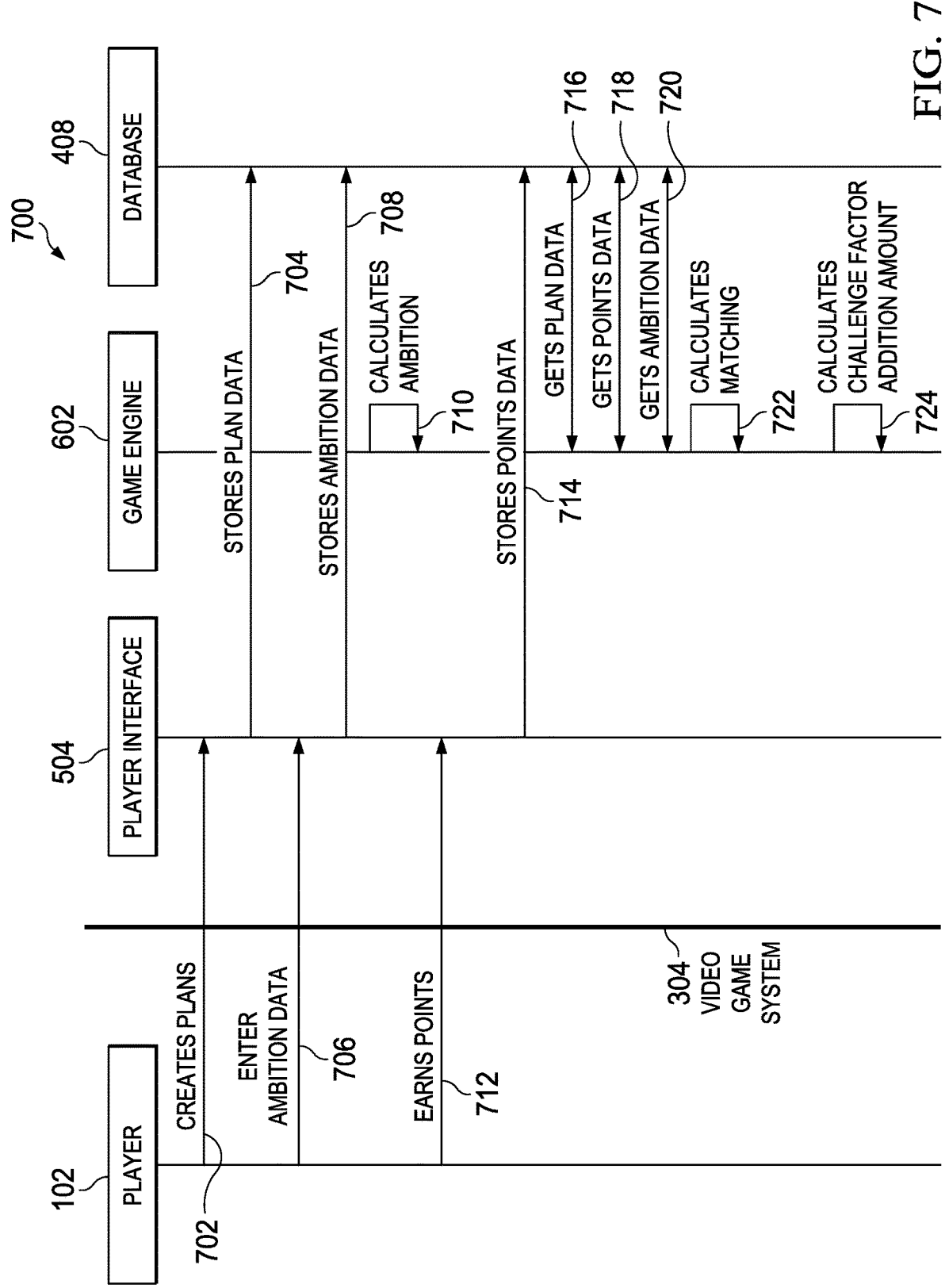
FIG. 7 is a sequence diagram of an illustrative process by which the player may use the video game system server to calculate the number of upgrades available to the player.

FIG. 7 is a sequence diagram illustrative of a process by which the player may use the video game system server to calculate the number of upgrades available to the player. The game engine 600 may calculate the number of upgrades earned by the player (for example, the amount of challenge factors earned by the player that the player may add to his or her protocol) using the following process. The player 102 may create and enter plans into the player interface 404 at step 702. At step 704, the player interface 404 may store the plan data in the database 308 via the game engine 600. The player 102 may enter challenge factor ambition data into the player interface 404 at step 706, and at step 708, the player interface 404 may store the ambition data in the database 308 via the game engine 600. At step 710, the game engine 600 may then use the ambition meter component 614 to calculate the ambition meter numeric value for the player 102. At step 712, the player 102 may earn points using the player interface 404, where the player may earn points by achieving challenge factors, performing virtual activities, family member performing an action, and so forth. The player interface 404 may store the points data in the database 308 via the game engine 600 at step 714. The game engine 600 may get plan, points, and ambition data from the database 308 at steps 716, 718, and 720. Using the plans and points data, the game engine 600 may use the matching meter component 612 at step 722 to calculate the matching meter numeric value for the player 102. At step 724, using the matching meter numeric value and the ambition meter numeric value, the game engine 600 may calculate the number of upgrades earned by the player 102 (e.g., the amount of challenge factors that the player that the player may add to his or her protocol 200, whereby each earned challenge factor represents an earned upgrade).

Analytics Viewer

Figure 8:
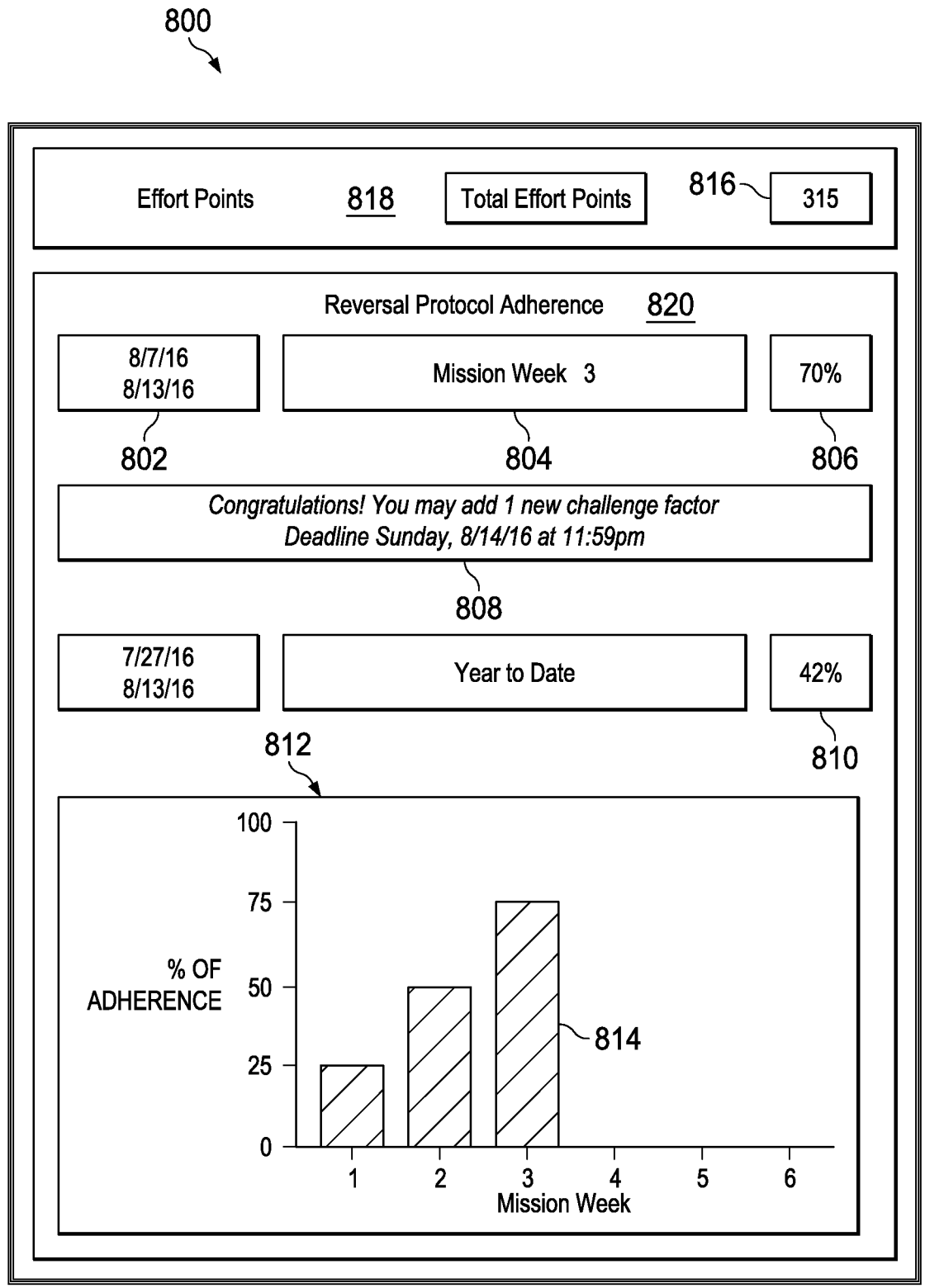
FIG. 8 is an illustration of an illustrative gaming report of the player's progress in the video game and reversal of his or her PRHC.

FIG. 8 is an illustrative video game user interface or analytics viewer 800 displayed on an electronic device (not shown) that presents an analytics viewer 800 that is generated by a video game system. The analytics viewer 800 may be displayed on a computer (e.g., desktop or laptop computer) or mobile device (e.g., mobile telephone, tablet computer). The analytics viewer is a display that provides feedback to the player and serves as a representation of the player. This screen features two sets of feedback data, 1) the player's effort points total 818, and 2) the player's reversal protocol adherence 820. The player's effort points total describes the total amount of effort that the player has expended, to date, to reverse his or her PRHC. The screen indicates that the player's current earned points total 816 is 315. Other ways to illustrate the player's progress toward reversal may include, for example, a graphic representation of the player getting skinnier.

The screen also features the player's reversal protocol adherence 820, i.e., the extent to which the player has performed or "matched" his or her reversal protocol over a period of time (e.g., over the course of a week, a set of weeks, or year to date). Reversal protocol adherence 820 reflects the skill level of the player and is communicated as a percentage. In this embodiment, the player's degree of skill—his or her reversal protocol adherence percentage—may be based on the player's actual challenge factor points earned over a set period of time, divided by the player's potential points over the same period of time. The game engine's matching meter component makes this calculation.

The screen featured in FIG. 8 reflects the computer-controlled rules that apply to the game's missions. These rules are associated with the missions' reward requirements and the missions' rewards. TABLE III presents one embodiment of such requirements and rewards. Not unlike other games that include missions, the player meets or exceeds the mission reward requirements in order to receive the mission rewards.

As mentioned, FIG. 8 is an exemplary screen presenting an analytics viewer which is a display that provides feedback to the player and serves as a representation of the player. This screen shows the player's reversal protocol adherence, or skill level, in percentage terms, over a period of time.

The screen illustrated in FIG. 8 shows that the most recent mission week completed by the player was mission week 3 as shown by the mission week start date and end date indicator 802, the mission week numeric display 804, and the percentage of adherence chart 812. Also shown for that week is the player's reversal protocol adherence percentage 806, or skill level, which is shown as being 70%. The screen may also show a box that contains reversal adherence percentage 806 highlighted in color (e.g., green), indicating that the player has earned at least one upgrade. The message to the player 810, also generated by the game engine, informs the player, "Congratulations! You may add 1 new challenge factor." This message corresponds to the information presented in TABLE II. For example, in TABLE II, column 2 shows that the target adherence percentage, or skill level, as determined by the game engine; this is the target that the player may meet or exceed on mission week 3 in order to earn an upgrade to be applied to a future mission, e.g., the following mission, mission 4. In TABLE III, column 3 shows that if the protocol adherence level for mission 3 is at least 70%, then the player may add a maximum of 1 upgrade. In the embodiment illustrated in FIG. 8, the 1 upgrade earned by the player is defined as a new challenge factor that the player may add. At the bottom of FIG. 8, the player's skill level over time is displayed in the percentage of adherence chart 812. As shown, the player's skill level has increased each week, over the 3 weeks since he or she started playing the game. In the middle of FIG. 8, the player's year-to-date skill level of 43% is displayed; this represents the player's average skill level across the 3 weeks of play. As shown at the bottom of FIG. 8, each week's skill level is displayed in the percentage of adherence chart 812, reflecting adherence levels of 25%, 50%, and 70%, respectively.

In one embodiment, the video game system may allow the player 102 to view his or her skill level as ranked against one or more other players 102.

Figure 9:
FIG. 9 is an illustration of a player interface allowing the selection of one or more protocol-specific challenge factors that are utilized in the video game provided herein.

FIG. 9 is an illustration of a player interface 900 allowing the selection of one or more protocol-specific challenge factors that are utilized in the video game provided herein.

To enable the player to create an initial standard reversal protocol 200, the game has the player go through its set up. This involves selecting challenge factors and creating a plan for each one. A challenge factor is a reversal-related challenge; an example of a challenge factor is "bed time" and an example of a corresponding challenge factor plan is "bed time at 10:00 pm Sunday through Thursday, and 12:00 am Friday and Saturday." Each challenge factor plan contains at least one challenge factor action. Each planned enactment of a challenge factor plan is referred to as a challenge factor action. In this example of a challenge factor plan for bedtime, seven challenge factor actions are included, one for each day of the week. In other words, in this example, the challenge factor plan includes seven challenge factor actions per week.

The game provides the player with a list of challenge factors 902 from which to select the one(s) that he or she would like to include in his or her standard reversal protocol 200. Each of the challenge factors available for selection by the game are considered actions associated with the reversal of PRHCs in general, or associated with the reversal of the player's targeted PRHC in particular.

For reversal protocols to be effective, the reversal protocols may satisfy two criteria:

1. Contain health habits and routines known to reverse the targeted PRHC(s), and, of equal importance.

2. Be suited to the person, meaning, the reversal protocols are to contain health habits and routines that the person wants to do, is able to do, and is allowed to do.

The first criterion is upheld by the computer as the game may be configured to present to the player for selection those challenge factors that satisfy this criterion. The second criterion may be upheld by the player as he or she creates his or her individual challenge factor plans. Specifically, he or she is to do his or her best to set plans that he or she wants to do, is able to do, and is allowed to do.

In accordance with the rules of the game, the player may be instructed to include certain game-required challenge factor in his or her protocols. The game enforces this rule by prohibiting the player to continue through the set up part until he or she sets a plan for each required challenge factor(s). In addition, the player may be allowed to add one or more optional challenge factors in accordance with the rules of the game.

FIG. 10 is a flow diagram of an illustrative process 1000 for performing a video game. The process 1000 may start at step 1002, where a player may be enabled to affect a representation of the player in response to the player accounting for and achieving challenge factors of the video game. At step 1004, rules of the video game may be applied and enforced. At step 1006, points of the player may be updated by one or more update components, and (ii) challenge factors available for the player to achieve to advance in playing the video game may be updated at step 1008. In an embodiment, a player interface engine may be configured to affect functionality of a representation of the player in response to the player accounting for and achieving or failing to account for or to achieve the real-world challenge factors. At step 1010, the player may be directed to establish a set of real-world challenge factors to achieve. At step 1012, the process 1000 may account for achieving or not achieving the real-world challenge factors. A communication may be performed at step 1014 to adjust the score of the player as represented by the representation of the player. At step 1016, in response to the score of the representation of the player being adjusted, the player representation profile engine may alter functionality of the representation of the player to represent that the player's achieving at least a portion of the planned challenge factors causes the health condition to be reversed.

FIG. 11 is a flow diagram of an illustrative process 1100 for performing a video game. At step 1102, the method 1100 may include generating a list of selectable challenge factors for a player to select one or more challenge factors when playing a video game. At step 1104, the player may be provided with the ability to set a plan for each of the challenge factors. The selected challenge factors and the planned challenge factors may be stored in a data repository at step 1106. At step 1108, a protocol inclusive of the planned challenge factors may be established to achieve over a time period. A player interface may be displayed at step 1110 for the player of the video game, where the player interface may show the protocol inclusive of at least a portion of the one or more planned challenge factors along with corresponding input elements associated with each planned challenge factor for the player to account for the planned challenge factors by submitting whether or not the player achieved each of the respective planned challenge factors, such that achieving at least a portion of the planned challenge factors causes the health condition to be reversed.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

What is claimed is:

1. A method, comprising:

generating, by a computing system, a list of selectable challenge factors for a player to select one or more challenge factors when playing a video game, the selectable one or more challenge factors being real-world challenge factors being associated with at least one of an eating protocol, lifestyle protocol, and medical oversight protocol;

providing, by the computing system, the player with the ability to set a plan for each of the selected one or more challenge factors to establish one or more planned challenge factors to be used to form an unalterable protocol to be performed over a time period;

storing, by the computing system in a data repository, the selected one or more challenge factors and the one or more planned challenge factors;

establishing, by the computing system, the unalterable protocol inclusive of the one or more planned challenge factors to achieve over the time period;

enabling the player to affect a representation of the player based on the player (i) accounting for or failing to account for, and (ii) achieving or failing to achieve the one or more planned challenge factors;

displaying, by the computing system, a player interface of the video game for the player, the player interface including:

(A) the protocol inclusive of at least a portion of the one or more planned challenge factors along with corresponding input elements associated with each planned challenge factor for the player to account for the at least a portion of the one or more planned challenge factors by submitting that the player:

(i) achieved, or
(ii) failed to achieve each of the at least a portion of the one or more respective planned challenge factors; and
(B) the representation of the player;
altering functionality of and/or the representation of the representation of the player in response to the player:
(i) failing to account for,
(ii) accounting for and achieving, or
(iii) accounting for and failing to achieve the at least a portion of the one or more planned challenge factors, such that:
(a) accounting for and not achieving the at least a portion of the one or more planned challenge factors leads to reversal of a potentially-reversible chronic disease,
(b) accounting for and achieving the at least a portion of the one or more planned challenge factors leads to reversal of the potentially-reversible chronic disease, and
(c) failing to account for the at least a portion of the one or more planned challenge factors leads to non-reversal of the potentially-reversible chronic disease;
calculating, by the computing system, points for the player by accumulating:
(a) a first number of points based on the player accounting for and not achieving the at least a portion of the one or more planned challenge factors, and/or
(b) a second number of points based on the player accounting for and achieving the at least a portion of the one or more planned challenge factors, and
calculating a numeric value based on the points earned by the player over the time period, wherein the points at the end of the time period lead to reversal or non-reversal of the potentially-reversible chronic disease.

2. The method according to claim 1, further comprising:
comparing the numeric value of the player earned over the time period to a threshold level to determine whether the potentially-reversible chronic disease of the player is reversing or not reversing based on that comparison; and
presenting an indication to the player that the potentially-reversible chronic disease is reversing or not reversing based that comparison.

3. The method according to claim 1, further comprising establishing, by the computing system, an ambition level and/or a difficulty level of the one or more planned challenge factors, as determined by the player.

4. The method according to claim 3, further comprising enabling the player to change or adjust the ambition level and/or the difficulty level of the one or more planned challenge factors as determined by the player after being established.

5. The method according to claim 1, further comprising establishing a skill level for the player.

6. The method according to claim 5, further comprising, after completion of the time period and before the start of a new time period for a new unalterable protocol to be performed:
enabling the player to:
modify the protocol;
add a challenge factor from the list of selectable challenge factors;
increase a difficulty level of at least one of the one or more planned challenge factors;
decrease a difficulty level of at least one of the one or more planned challenge factors; and
remove a challenge factor from the protocol to establish a new unalterable protocol to be performed over the new time period.

7. The method according to claim 1, further comprising modifying the protocol as a skill level of the player increases or decreases based on the player (i) accounting for and not achieving, or (ii) accounting for and achieving any of the at least a portion of the one or more planned challenge factors, or (iii) failing to account for any of the at least a portion of the one or more planned challenge factors.

8. The method according to claim 7, wherein the selectable challenge factors are real-world challenge factors including action to be performed by the player.

9. The method according to claim 8, wherein the player completing any of the one or more planned challenge factors while playing the video game increases the number of points associated with the player to cause the representation of the player to be altered to indicate that the player is reversing the potentially-reversible chronic disease.

10. The method according to claim 1, further comprising allowing the player to compare the player's skill level to skill levels of other players.

11. The method according to claim 1, further comprising allowing the player to compare the points of the player to points of other players.

12. The method according to claim 1, further comprising:
establishing the points of the player;
adjusting the points of the player in response to the player:
(i) accounting for and achieving, and/or
(ii) accounting for and failing to achieve the at least a portion of the one or more planned challenge factors; and
altering functionality of and/or the representation of the representation of the player in response to the points of the player being adjusted.

13. The method according to claim 1, wherein providing the player with the ability to set a plan for each of the selected one or more challenge factors includes enabling the player with the ability to establish an eating plan and/or calendar.

14. The method according to claim 1, further comprising awarding accounting points and achievement points to the player in response to the player submitting that he or she successfully achieved or failed to achieve a particular challenge factor action, wherein the accounting points and achievement points are distinct from one another, and wherein the first number of points is the accounting points, and wherein the second number of points is the sum of the accounting points and the achievement points.

15. The method according to claim 14, wherein
(i) if the player fails to account for achieving or not achieving the at least a portion of the one or more planned challenge factors, then neither accounting points nor achievement points are awarded to the player;
(ii) if the player accounts for and achieves the at least a portion of the one or more planned challenge factors, then points are awarded for both accounting for and achieving; and
(iii) if the player accounts for and fails to achieve the at least a portion of the one or more planned challenge factors, then points are awarded for accounting for, but not achieving the at least a portion of the one or more planned challenge factors.

16. The method according to claim 1, wherein the first number of points is lower than the second number of points.

17. The method according to claim 16, wherein
the first number of points per a given challenge factor action equals 1; and
the second number of points per a given challenge factor action equals 2.

* * * * *